United States Patent [19]

Julesz et al.

[11] 4,023,911

[45] May 17, 1977

[54] STEREOPSIS TEST PATTERNS FOR ADJUSTMENT OF STEREOMICROSCOPES IN THE INSPECTION OF THREE-DIMENSIONAL OBJECTS

[75] Inventors: Bela Julesz, Warren; Becky Thomas Kerns, Summit; Milton Everett Terry, Mountainside, all of N.J.

[73] Assignee: Bell Telephone Laboratories, Incorporated, Murray Hill, N.J.

[22] Filed: Apr. 12, 1976

[21] Appl. No.: 675,771

[52] U.S. Cl. .............................. 356/237; 350/132; 50/144; 350/320; 356/244

[51] Int. Cl.$^2$ ...................................... G01N 21/60

[58] Field of Search .............. 350/35, 36, 130, 132, 350/144, 145, 320, 92, 94; 351/3, 33; 356/237, 244

[56] References Cited

UNITED STATES PATENTS

2,674,156  4/1954  Mahler .............................. 350/132

OTHER PUBLICATIONS

Julesz, *Foundations of Cyclopean Perception;* University of Chicago Press; pp. 89–91, 198–201, 270, 285–289, 249, 315; 1971.

Julesz, "Binocular Depth Perception of Computer Generatal Patterns", *Bell System Tech. J.,* vol. 39, pp. 1125–1162, 1960.

*Primary Examiner*—John K. Corbin
*Assistant Examiner*—Matthew W. Koren
*Attorney, Agent, or Firm*—Michael J. Urbano

[57]           ABSTRACT

Random dot stereograms are used as stereopsis test targets to align stereomicroscopes in a technique for inspecting three-dimensonal objects. The random dot stereograms are computed and mounted on a holder such that they simulate inspection conditions of the three-dimensional object being inspected. The appearance of a pattern in depth on the random dot stereograms is an objective test as to whether the microscope has been adjusted properly by the inspector. In addition, random dot stereograms can also be used to (1) screen inspectors for stereodeficiencies, (2) facilitate the training of inspectors, and (3) monitor inspection rate control and fatigue of inspectors during inspection.

13 Claims, 3 Drawing Figures

STEREOPSIS TEST PATTERNS FOR ADJUSTMENT OF STEREOMICROSCOPES IN THE INSPECTION OF THREE-DIMENSIONAL OBJECTS

BACKGROUND OF THE INVENTION

The invention is directed to the use of random dot stereograms as stereopsis test patterns for adjustment of commercially available stereomicroscopes for inspection of three-dimensional objects. The stereopsis test patterns are an objective standard for adjusting a stereomicroscope, a means for training inspectors in the use of the microscope, a test for screening personnel for the presence of stereopsis, and can be used to monitor inspection rate and fatigue during the inspection period.

Many products depend on visual inspection of their surface for quality control. For example, microscopy is useful in the microelectronics industry for device fabrication and inspection. Generally, binocular microscopes are employed for this purpose. The binocular microscope has two eyepieces, but presents the same planar image to each eye. In contrast, the stereomicroscope has two optical viewing paths which act as extensions of the eyes so that each receives a separate view of the image with the appropriate binocular parallax to give a three-dimensional effect. A stereomicroscope is used to examine three-dimensional objects or three-dimensional defects such as nodules or pits which are difficult to distinguish with a binocular microscope. However, there are two major disadvantages to the use of a stereomicroscope. First, a portion of the population is unable to attain stereopsis and gains little benefit from the use of a stereomicroscope. In fact, two percent of the total population is stereoblind and fifteen percent of the population is stereodeficient. (Julesz, *Foundations of Cyclopean Perception*, University of Chicago Press, Chicage, 1971, page 270). These people are unaware of their deficiency because of the large number of monocular depth cues, such as movement parallax and familiarity, which conceal the absence of stereopsis.

Random dot stereograms are devoid of monocular depth cues and can be used as a means to detect the absence of stereopsis. Random dot stereograms (Julesz, The Bell *System Technical Journal*, Vol. 39, No. 5, 1960, pages 1125–1162) are computer generated patterns which contain no depth cues other than binocular parallax (a horizontal shift) between the left and right images. When these images are stereoptically fused, predetermined patterns printed on them will appear in depth. The stereograms were originally developed for psychological experiments tracing the flow of perceptual information in the central nervous system. Besides detection of stereopsis, opthalmologists and optometrists have also used stereograms to test pattern recognition in children. A few medical schools have adopted their use in screening for admission to the specialty of X-ray fluroscopy in which heart catheterizations are done with stereo X-ray viewing.

A second disadvantage in the use of a stereomicroscope is the difficulty of adjusting the microscope to obtain stereopsis. Adjustment of a stereomicroscope is a subjective procedure involving focussing and stereoalignment. Focusing refers to adjustment of the field of depth and stereoalignment refers to adjustment of the resolution and interocular distance. The trouble in adjustment arises because there are no objective standards on which to base judgment. Pictures of a sample viewed through a properly focused microscope are often available for comparative purposes. Such pictures are employed in training microscope technique, uually in conjunction with an explanation of the mechanics of operation. Training microscopes are also available which have two sets of eyepieces so that the instructor can observe what a student is doing. However, criticism by the instructor depends on his own judgment.

Focal length and resolution may be determined or adjusted by means of commercial test patterns. However, the test patterns commonly used, such as Abbe or Ealing patterns, consist of a series of equally spaced high contrast lines which decrease in size. The resolution or lateral area is determined by that fineness of lines where the lines just turn to grey. The same standard is used to determine the focal length or field of depth.

SUMMARY OF THE INVENTION

In accordance with one embodiment of the invention, miniaturized random dot stereograms are employed to facilitate adjustment of a stereomicroscope in the inspection of three-dimensional objects. The random dot stereograms are made to simulate inspection conditions so that, when the microscope is adjusted using the stereograms, it will then also be adjusted for inspection of the objects. Depth of field is determined by vertically separating the left and right images of the stereograms by the height of the zone which is to be inspected. Resolution (magnification or area within the field of view) is determined by the size of the stereogram. Interocular distance must be adjusted to approximate the distance between the inspector's eyes in order to have the pattern on the stereograms appear in depth. Additionally, the size of the dots, if made approximately equal to the acceptance limit of defects, can be used for comparative purposes.

Basically, the inspection technique involves the use of random dot stereograms, designed to simulate inspection conditions of a particular object, as stereopsis test patterns to align a stereomicroscope for inspection of that object. Appearance of a pattern in depth assures the inspector that the microscope is adjusted for inspection. A single stereogram or a test plate having a plurality of stereograms with different patterns printed on them can be presented. By presenting the inspector with a stereopsis test pattern at various times after the initial alignment, inspector fatigue and the need for realignment can be monitored.

The patterns can be present in various forms. In one embodiment the left and right images are mounted on opposite sides of a transparent holder such that they are superimposed and in substantial registration with each other. Alternatively, the left and right images of the stereograms are mounted on separate transparent holders and must be superimposed and brought into substantial registration by the inspector while observing the images through the microscope. The latter embodiment involves a cost reduction since prealignment of the images is not necessary and has the additional advantage of enabling the inspector to improve his manipulatory skills. In another embodiment, at least one random dot stereogram is mounted on a holder which carries the object to be inspected, so that the inspector can easily bring the stereograms into view for reference or realignment.

DETAILED DESCRIPTION

Figure 1:
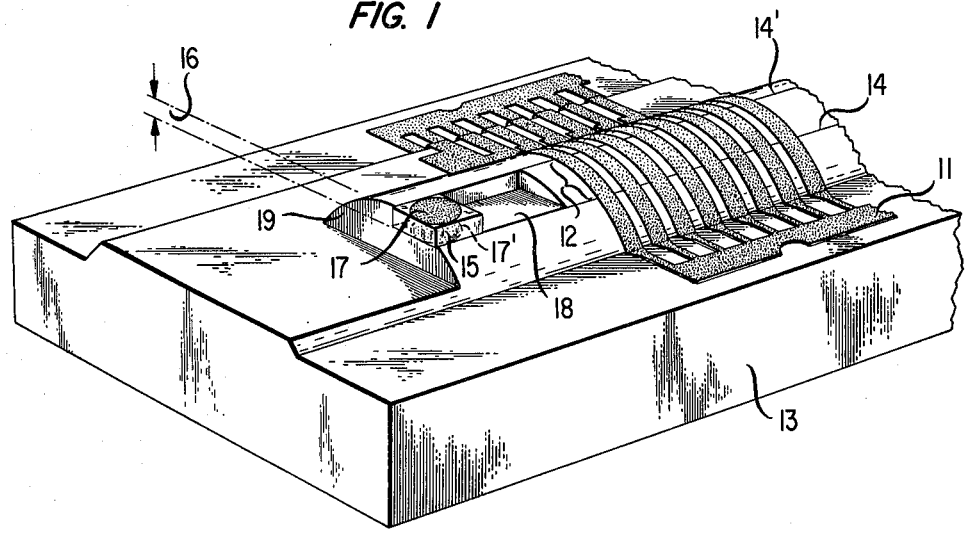
FIG. 1 shows a sample holder, designed in accordance with one embodiment of the invention, to be used in conjunction with a commercially available stereomicroscope to inspect an electrical connector for defects.

Before discussing the invention in detail it will be instructive to first consider the nature of random dot stereograms.

Random dot stereograms are computer generated patterns which contain no depth cues other than binocular disparity. Julesz and Miller in *Bell System Technical Journal*, Vol, 41, 1962, pages 663–676 give an algorithm for the production of a random dot stereogram. Additional information is given in Julesz, *Foundations of Cyclopean Perception*, supra. pages 285–289. Straightforward computer techniques can be used to generate stereograms adapted for particular purposes. Typically, a stereogram comprises left and right images which when viewed monocularly appear as random dots, but when stereoscopically fused a preprinted geometric pattern emerges which either hovers over or sinks below the plane of the rest of the fused image. Both left and right images contain a geometrically shaped region printed in the same random pattern. That region in the left image is uniformly displaced in a horizontal direction with respect to the same region in the right image. The area surrounding the geometrically shaped region is printed in a different random pattern but is otherwise identical on both images. The images are usually superimposed and then optically filtered so that the left image only is directed to the left eye and the right image only is directed to the right eye. The depth which the pattern appears to have when stereoptically fused is proportional to the horizontal displacement (binocular parallax) between the patterns. Whether the pattern appears in the nasal (out) or temporal (in) direction depends on the direction of the horizontal displacement.

Besides "dots" in the sense of circular points, stereograms can be printed as lines or letters (*Foundations of Cyclopean Perception*, supra. pages 89–91). Stereograms may also be presented in various formats. For the purposes of the invention, either anaglyph or vectograph format is preferable. Anaglyph format (*Foundations of Cyclopean Perception*, supra. page 315) involves superposition of left and right images, each of which is printed in the complementary color of the other. The anaglyph is viewed through a pair of lenses of which one is anaglyph is viewed through a pair of lenses of which one is the same color as the left image and the other is the same color as the right image. The lenses act as optical filters to separate the left and right images by blocking that image which is printed in the same color. The vectograph format, on the other hand, is a polarizing version of the anaglyph (*Foundations of Cyclopean Perception*, supra. page 249). The name Vectograph (Trademark of Polaroid Corporation) is used to denote a type of polarizing film used in three-dimensional photography. Generally, images of the stereograms are printed with zero percent and one hundred percent polarized areas. Shading is possible by decreasing the amount of polarization. The images are optically filtered by a pair of polarized lenses. One lens has polarization perpendicular to that of one image so that the polarized area of that image will appear black. Conversely, the other lens has polarization perpendicular to that of the other image. Better separation of the images can be obtained with this format since the other image will have polarization parallel to the one lens and will therefore be transparent. To achieve this advantage, however, the images and the lenses should be carefully aligned so that the polarization is in the desired direction as described above.

In accordance with one embodiment of this invention, random dot stereograms are used as stereopsis test pattern to adjust a commercially available stereomicroscope for the inspection of three-dimensional objects for surface defects. The random dot stereograms are presented to simulate certain physical characteristics of the object to the inspector. In particular, the total pattern size is chosen to approximate the area to be encompassed within the field of view at the desired magnification, and the vertical separation between left and right images of the stereogram is chosen to approximate the height of the zone to be inspected so that the field of depth of the microscope will be focussed over that distance. After adjustment of the interocular distance, the emergence of a sharp pattern in depth on the stereogram objectively indicates that proper resolution, field of depth, and binocular vision have been achieved and that the microscope is set up for inspection of the object. The easily identifiable pattern on the stereograms facilitates adjustment by avoiding the usual ambiguities associated with focussing on unknown surface defects.

An illustrative technique comprises the steps of:

A. placing a suitably designed random dot stereogram within the field of view of a stereomicroscope;

B. focussing the stereomicroscope on the stereogram by first adjusting the resolution to encompass the whole stereogram within the field of view and then adjusting the field of depth so that dots on both left and right images are sharp;

C. adjusting the interocular distance between the two optical viewing paths of the microscope to match the horizontal distance between the eyes of the inspector using the microscope;

D. optically filtering the optical viewing paths with appropriate lenses so that the left image appears in the left path and the right image in the right path so that the images must be stereoptically fused to translate the horizontal parallax between the images into depth;

E. observing a sharp pattern in depth which indicates that the microscope has been adjusted properly, if not, then additional focussing or adjustment of interocular distance is required;

F. removing the lenses used for optically filtering to prevent light loss while inspecting; and G. placing the object to be inspected within the field of view of the microscope and then proceeding with inspection.

As an illustration of the usefulness of the invention, an application is found in the inspection of gold plated electrical connectors used in an electronic switching system. Referring to FIG. 1, the connector 11 is shaped like a curved comb and has a critical zone 12 (lying between lines 14 and 14') where electrical contact is made. Visual examination of the critical zone is made to detect common surface defects such as voids (unplated areas), pits, and nodules (built-up excessive material). Stereomicroscopes are used because the critical zone covers a three-dimensional surface and stereovision enbales pits to be distinguished from nodules.

Studies of the prior inspection procedure revealed that the inspectors were unable to reproduce both their own results and the results of others in the identification and location of defects. Further investigation demonstrated that the inspectors were not adjusting their microscopes properly and, thus, did not attain stereopsis with its attendant advantages. The two major factors contributing to the lack of inspector reliability were the subjectivity required to adjust resolution and field of depth and the inability of the inspectors to adjust the interocular distance of the microscope to match the distance between their own eyes.

In order to facilitate reliable microscope adjustment in accordance with the invention, miniaturized random dot stereograms are computed and presented to simulate the inspection conditions of zone 12 of connector 11 shown in FIG. 1. A holder shaped to conform to the curves of the connector and having the lines 14 and 14' designating the zone 12 which must be examined, is used in conjunction with stereograms mounted as shown. In particular, the raised portion 19 of holder 13 has a flat surface 18 to conveniently carry a transparent spacer 15. That is, the left and right images of the stereogram 17 and 17' respectively, are mounted one on surface 18 and the other on the top side of spacer 15 so that the vertical separation 16 between the images is approximately equal to the height of zone 12. And, the total size of the stereogram is made to be approximately equal to the distance between lines 14 and 14' designating the width of zone 12. The stereograms can be brought into view by the inspector when desired by moving the holder 13. This embodiment is advantageous because the stereogram is always available to the inspector for use in realignment or for comparative purposes.

Figure 2:
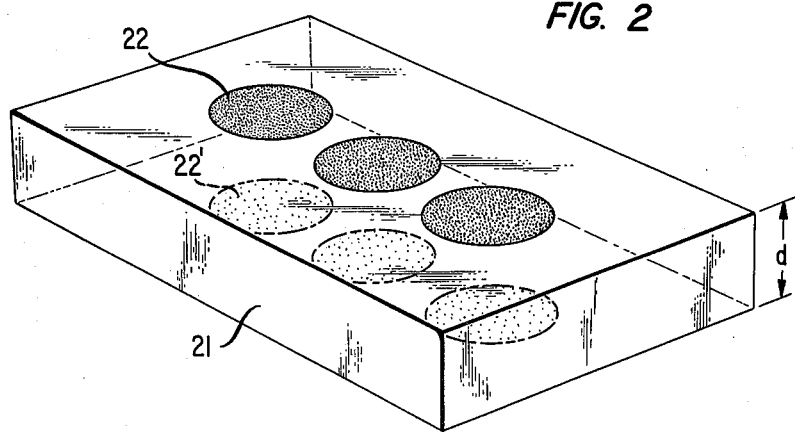
FIG. 2 and FIG. 3 show other illustrative embodiments for presenting random dot stereograms in the inventive technique.

However, in the embodiment reduced to practice, the holder actually used functioned only to hold the connector in place for inspection after the microscope had been set up. That is, raised portion 19 had no flat surface 18. Instead, as shown in FIG. 2, the stereograms images 22 and 22' were presented on opposite sides of transparent slide 21.

The microscope was first focussed on stereograms. When the field of view encompassed the entire area of a stereogram, the resolution or magnification was adjusted for inspection over the width of zone 12. When the dots on both the left and right images 22 and 22' were in foucs (as evidenced, in particular, by the appearance of a sharp pattern in depth,) the field of depth was adjusted over the height of zone 12. Then the interocular distance of the stereomicroscope was adjusted to match the horizontal distance between the eyes of the inspector using the microscope. If this is not done accurately, the stereogram will be viewed monocularly and stereoptical fusion of the images will not be possible. The appearance of the sharp pattern in depth was unambiguous proof that the microscope was adjusted to attain stereopsis. After adjustment through use of the stereogram, the microscope was set up to inspect the connector.

The miniaturized random dot stereograms used in this invention were produced by well known optical and ion beam scanning techniques. An Optronics microdensitometer and scanner under computer control was used to produce the negatives of the random dot stereograms. The Stereo Optical Company of Chicago produced vectographs from the negatives. With a dot resolution of 12.5 micrometers, the total target size was appropriate for about 10-12X magnification. A size reduction of the stereograms would allow for an increase in magnification range and, thus, would enable inspection of objects such as semiconductor masks and wafers. The resulting decrease in dot size would enable them to be used for comparative purposes; that is, by printing the dots to be euqal to the acceptance limits for defect size, the inspector can monocularly view, by closing one eye, the stereogram and compare dot size with defect size to determine the criticality of the defect. The binocular parallax between left and right images can even be computed so that the perceived depth of the pattern can serve as a threedimensional measuring scale for the acceptance limit on height or depth of the defects.

Vectographs were used because anaglyphs do not give as good a channel separation. However, anaglyphs are easier to optically filter. Because the colored lenses used to filter anaglyphs can be rotated, they can be placed over the eyepieces even while focussing. In contrast, the polarized lenses required to filter vectographs must be oriented in the right direction when they are inserted in the optical path, i.e., placed over the eyepieces after focussing or worn as glasses by the inspector. The polarized lenses also decrease the amount of light admitted to the eyes and should not be used during adjustment of the microscope.

In one embodiment the vectographs were mounted as in FIG. 2. The left and right images 22 and 2' were premounted, one on each side, on microscope slide 21. The thickness of the slide, $d$, was approximately equal to the height of the critical zone of the connector (zone 12 of FIG. 1). In another embodiment, the images were mounted with one image on a top major surface of the slide and the other on the top of a transparent spacer to separate the images by approximately the height of the critical zone.

In the connector inspection scheme, four stereopsis patterns were used: "L", "T", "C", and "Δ". The identity of the patterns was unknown to the inspectors using them for stereoalignment in order to prevent guessing or possibly mental reconstruction of the pattern in depth. The inspector was presented with the stereograms at various time intervals to check for the need for realignment. By mounting a plurality of the patterns on a slide, various permutations and combinations of patterns further decreased the probability of guessing and forced the inspector to adjust the microscope correctly.

Figure 3:
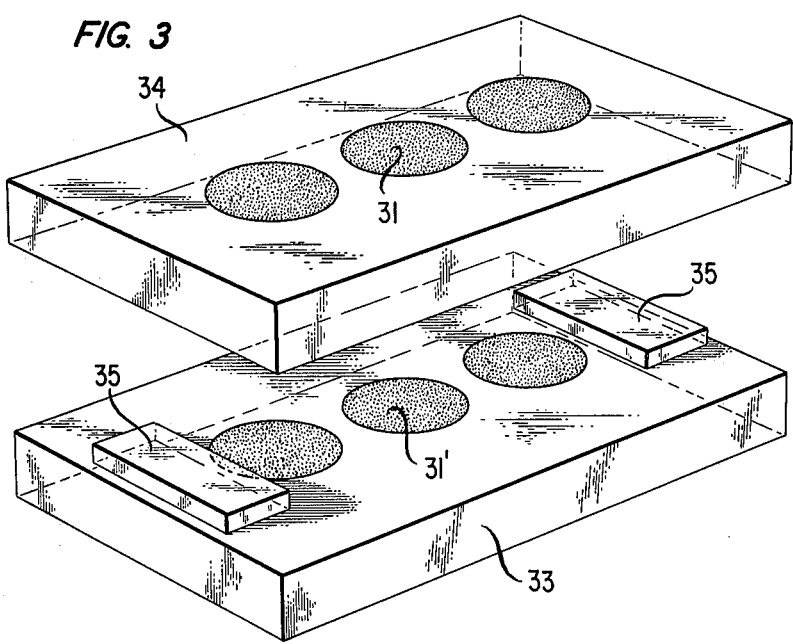

Another embodiment shown in FIG. 3 reduces the cost of the test plate by eliminating the need for preregistration of the images. Furthermore, it gives the inspector the opportunity to improve his manipulatory skills. Manipulatory skills are important since the object being inspected must often be moved to determine defect type, and since defective objects often undergo further operative steps, e.g., the defective tines of the comb-like connector may be marked and then clipped out or repaired. In this embodiment, the images of the stereograms are mounted on separate transparent holders 33 and 34 so that the inspectors have to bring the images into registration before focussing. This may be accomplished by mounting a left image 31' on a top major surface of transparent holder 33 and a right image 31 on a top major surface of holder 34. Spacers 35, such as a number of cover glasses, are placed between the slides to separate the images by approximately the height of the critical zone and to prevent the stereograms from being scratched or otherwise damaged by the moving slides.

Cost can be further reduced through the use of a family of stereograms having a common left image and a series of right images. The right images have different patterns printed thereon which are capable of producing a pattern in depth when brought into substantial registration with the common left image. This technique has the advantage of allowing a great variety of patterns to be presented including placebos, i.e., a pair of images which despite the best efforts of the inspector will not show a pattern in depth. This is another means to prevent guessing.

The presentation of the stereograms described above and their use in the inspection of connectors is for the purpose of illustration only. Other variations are possible within the scope of the invention. The following benefits gained through the use of the stereograms further demonstrate the usefulness of the invention.

The use of random dot stereograms in an inspection scheme screens stereodeficients who gain little or nothing from the use of a stereomicroscope and should not be employed for its use. For an observer capable of achieving stereopsis, the miniaturized random dot stereograms offer an objective test for stereoalignment are easy enough to identify that they can be used for training purposes. The stereograms can also be used for the cross calibration of microscopes since they are made to simulate both focal length and resolution, each of which must be adjusted with sufficient accuracy for the pattern in depth to appear.

The stereograms can also be used to monitor fatigue and rate control. Mental perception lags behind ocular perception and a latent image remains after ocular stimuli have been removed. Therefore, if inspection time is too short, defects may be missed or a perceived defect may be translated to an adjacent area of the object being inspected, e.g., to an adjacent tine of the comb-like connector. The stereograms can be used to measure perception time and image retention for determining a preferred inspection rate for each individual. Julesz describes studies of the perception time of stereopsis in *Foundations of Cyclopean Perception*, supra. pages 198–210. The ability to perceive defects quickly varies among individuals and is a function of fatigue and other environmental factors. By presenting the inspectors a set of random dot stereograms at random time intervals, time for stereopsis (and, thus, inspection rate) can be monitored and the need for realignment of the microscope discovered and corrected. Finally, the appearance of the pattern in vivid depth is a pleasant sensation and relieves the boredom of a tedious job.

What is claimed is:

1. A technique for adjusting a stereomicroscope for inspection of three-dimensional objects comprising the steps of:
   a. placing a random dot stereogram within the field of view of a stereomicroscope having a pair of optical viewing paths; the random dot stereogram being of such size that it encompasses approximately the same field of view as the zone of the object to be inspected at the desired magnification for inspection, and having left and right images which are separated by a vertical distance approximately equal to the height of the zone to be inspected on the object; the left and right images having a predetermined pattern printed thereon;
   b. focussing the stereomicroscope on the random dot stereogram;
   c. adjusting the interocular distance of the paths to match the horizontal distance between the eyes of the inspector using the stereomicroscope;
   d. optically filtering each of the paths with means so that the left image of the random dot stereogram appears in one path and the right image appears in the other path;
   e. detecting the pattern in depth on the random dot stereogram;
   f. removing the filtering means from the paths; and
   g. placing the object to be inspected within the field of view of the stereomicroscope.

2. The technique of claim 1 wherein the left and right images of a random dot stereogram are mounted on separate holders, and including between steps (a) and (b) the additional step of moving the holders to bring the images into substantial registration.

3. The technique of claim 1 wherein in step (a) the random dot stereogram is in vectograph format in which the stereogram is formed by polarized dots, the left image having dots polarized perpendicular to those of the right image, and in step (d) each path is optically filtered by polarized lens means.

4. The technique of claim 1 wherein in step (a) the at least one random dot stereogram is in anaglyph format in which the left image is formed in the complementary color of the right image, and in step (d) each path is optically filtered by colored lens means.

5. The technique of claim 1 wherein the at least one random dot stereogram is comprised of dots the size of which is approximately equal to the acceptance limit of defects found on the three-dimensional object.

6. The technique of claim 1 further comprising the steps of:
   h. after step (g), periodically placing a random dot stereogram within the field of view of the stereomicroscope and then repeating steps (d) through (g).

7. The technique of claim 6 wherein, in step (e), no pattern in depth is detected and then step (f) is repeated followed by steps (b) through (g).

8. A device to aid in the alignment of a stereomicroscope for inspection of three-dimensional objects which comprises:
   a. at least one random dot stereogram having left and right images and being of such size that it encompasses approximately the same field of view as the zone of the object to be inspected at the desired magnification; and
   b. a transparent holder on which the left and right images are mounted; the left and right images having a vertical separation between them approximately equal to the height of the zone.

9. The device of claim 8 wherein the at least one random dot stereogram is comprised of dots the size of which is approximately equal to the acceptance limit of defects found on the three-dimensional object.

10. A device to aid in the alignment of a stereomicroscope for inspection of three-dimensional objects which comprises:
    a. at least one random dot stereogram having left and right images and being of such size that it encompasses approximately the same field of view as the zone of the object to be inspected at the desired magnification for inspection;

b. a first transparent holder on which one image of the at least one random dot stereogram is mounted;

c. a second transparent holder on which the other image of the at least one random dot stereogram is mounted; the second holder being slidably positioned on the top of the first holder such that the images can be superimposed and brought into substantial registration with each other and such that the vertical separation between the images is approximately equal to the height of the zone of the object to be inspected; and d. spacers positioned between the holders to prevent the one image from being damaged by the sliding of the holders.

11. The device of claim 10 wherein the at least one random dot stereogram is comprised of dots the size of which is approximately equal to the acceptance limit of defects found on the three-dimensional object.

12. A sample holder for use with a stereomicroscope in the inspection of three-dimensional objects which comprises:

a. a base;

b. means for removably mounting the object on the base;

c. means to demarcate a zone of the object over which inspection is desired; the zone having a height and a width;

d. at least one random dot stereogram having left and right images, one which is mounted on a top surface of the base and the other which is superimposed and in substantial registration with the first image; the at least one random dot stereogram being of such size that it encompasses approximately the same field of view as the width of the zone at the desired magnification for inspection; and e. spacers provided between the left and right images of the at least one random dot stereogram so that the vertical separation between the images is approximately equal to the height of the zone.

13. The device of claim 12 wherein the at least one random dot stereogram is comprised of dots the size of which is approximately equal to the acceptance limit of defects found on the three-dimensional object.

* * * * *